(12) United States Patent
Johnson

(10) Patent No.: US 7,819,216 B1
(45) Date of Patent: Oct. 26, 2010

(54) MOTORCYCLE CONVERSION ASSEMBLY

(76) Inventor: Danny D. Johnson, 1560 Knifley Rd., Elkhorn, KY (US) 42733

( * ) Notice: Subject to any disclaimer, the term of this patent is extended or adjusted under 35 U.S.C. 154(b) by 280 days.

(21) Appl. No.: 12/184,638

(22) Filed: Aug. 1, 2008

Related U.S. Application Data

(60) Provisional application No. 60/956,739, filed on Aug. 20, 2007.

(51) Int. Cl.
*B60K 13/00* (2006.01)
*B60K 13/06* (2006.01)

(52) U.S. Cl. .............. 180/209; 280/124.109; 280/204; 280/293; 280/767

(58) Field of Classification Search .......... 180/21, 180/209, 311; 280/124.109, 124.128, 204, 280/293, 295, 755, 767, 781, 783, 787, 788, 280/798
See application file for complete search history.

(56) References Cited

U.S. PATENT DOCUMENTS

| | | | |
|---|---|---|---|
| 1,283,636 A | 11/1918 | Bennett | |
| 1,384,087 A | 7/1921 | Purdy | |
| 3,700,059 A | 10/1972 | Sutton | |
| 4,437,535 A | 3/1984 | Winchell et al. | |
| 4,449,602 A * | 5/1984 | Dittmann, Jr. | 180/215 |
| 5,029,894 A | 7/1991 | Willman | |
| 5,518,259 A | 5/1996 | Hall | |
| 5,853,057 A * | 12/1998 | Mullins | 180/16 |
| 6,612,389 B1 * | 9/2003 | Bell | 180/209 |
| 6,739,420 B2 * | 5/2004 | Mullins | 180/209 |

FOREIGN PATENT DOCUMENTS

DE 586047 * 10/1933

* cited by examiner

*Primary Examiner*—Toan C To
*Assistant Examiner*—Joseph Rocca
(74) *Attorney, Agent, or Firm*—Laura M. Hagan

(57) ABSTRACT

A motorcycle conversion assembly comprises a pair of sub-frame structures to be connected to a motorcycle frame in at least three points and substantially traversing the length of the motorcycle. The conversion assembly can be disconnected by the cycle owner while maintaining the structural integrity of the motorcycle and the rear drivewheel. A pair of trailing arm structures are rotatably affixed to each of the sub-frames with bushings and extend aft of the drivewheel and each contain an additional pair of wheel hub assemblies, essentially equal in size to standard cycle tires. Lower shock absorber mounts are disposed on the trailing arms adjacent to the wheel hub assemblies to accommodate a total of four shock absorbers where the upper shock absorber mounts are affixed to the sub-frame of the conversion assembly and subsequently the motorcycle frame. Stabilizer rods laterally secure the trailing arm assemblies to the motorcycle frame.

10 Claims, 4 Drawing Sheets

US 7,819,216 B1

MOTORCYCLE CONVERSION ASSEMBLY

This application claims priority to U.S. Provisional Patent Ser. No. 60/956,739 filed on Aug. 20, 2007.

BACKGROUND OF THE INVENTION

The present invention relates to a new and novel motorcycle conversion assembly used to convert a two-wheeled motor driven vehicle, particularly motorcycles, into a four-wheeled cycle without damaging the integrity of the motorcycle and while providing additional safety and stability to the rider and cycle as a unit. Traditional means of steering a two-wheeled motorcycle require the rider to shift his/her center of gravity in order to affect the proper turning radius which leaves very little of the cycle navigation to the handlebars. A change in a rider's center of gravity while in motion can be costly to even a cautious driver and has resulted in numerous cycle fatalities. This danger is only exacerbated with the addition of passengers, physical limitations or fatigue by the primary rider and/or poor road conditions.

A standard motorcycle tire is most effective when the greatest percentage of tread to pavement contact occurs. When a rider shifts his/her weight to angle the cycle in a turn, the percentage of surface area contact is reduced which results in less traction between the tire and riding surface. It is this maneuver that leads to the instability of the cycle and has proven to be particularly dangerous on surfaces that provide a less that optimal riding surface, such as the presence of bad weather or road debris. By adding two additional wheels to the existing frame of a motorcycle and maintaining the existing equipment and mechanics of the cycle, an option of stability and comfort can be added or subtracted, according to the owner's preferences.

Many of the prior art conversion kits require the rear drive wheel to be removed before adding any type of conversion kit which also requires alteration to the inherent braking mechanism of the cycle and alterations to the motive force mechanisms of the original cycle design. These conversions can harm the structural integrity of the cycle by requiring permanent welds or hitches which excludes the possibility of reinstating the two wheeled version of the cycle. The motorcycle conversion assembly of the present invention solves this deficiency in the prior art which gives the cycle owner the option to have the conversion assembly removed and the original cycle restored. Furthermore, similar conversion assemblies of prior art consist of two or fewer rigid connection points. These rigid connections often result in increased stress and strain on the cycle and conversion assembly which could result in structural failure after prolonged use.

SUMMARY OF THE INVENTION

The motorcycle conversion assembly of the present invention entails the addition of two rearward wheels that are disposed behind and to either side of a motorcycle's existing drive wheel. One novel aspect of this assembly includes the positioning of the additional wheels of the conversion assembly rearward of the existing cycle's drive wheel. This feature creates a longer wheel base and widens the surface area contact which increases the stability of the completed unit.

In addition, the two wheel addition of the conversion assembly returns control of the motorcycle to the steering assembly and negates lateral movements while riding that could be potentially hazardous or cumbersome on long rides. The conversion assembly addition also allows those which are incapable of maneuvering a two-wheeled cycle due to physical limitations to enjoy the benefits of owning a cycle.

Another novel aspect of the conversion assembly is multiple connections that are made to the original frame of the cycle to be converted. Three separate connections at various locations which strategically disperse the load reduce stress and strain on both the cycle and the conversion assembly. In addition, the multiple connections allow the conversion assembly and the cycle to form a single unit in which the conversion assembly and the original cycle react in tandem with one another. By thoroughly integrating the conversion assembly and the cycle to a single unit the rider enjoys a greater predictability of the cycle reaction when encountering uneven surfaces.

DETAILED DESCRIPTION OF THE INVENTION

The motorcycle conversion assembly 11 is used to convert a two-wheeled motorcycle into a four-wheeled cycle. In the following description, numerous specific details and options are set forth in order to provide a more thorough understanding of the claimed invention. It will be appreciated, however, by one skilled in the art that the motorcycle conversion assemblies 11 may be practiced without such specific details or optional components and that such descriptions are merely for convenience and as such solely selected for the purpose of illustrating the invention. Reference to the figures showing embodiments of the present invention are made to describe the invention and do not limit the scope of the disclosure herein.

Figure 1:
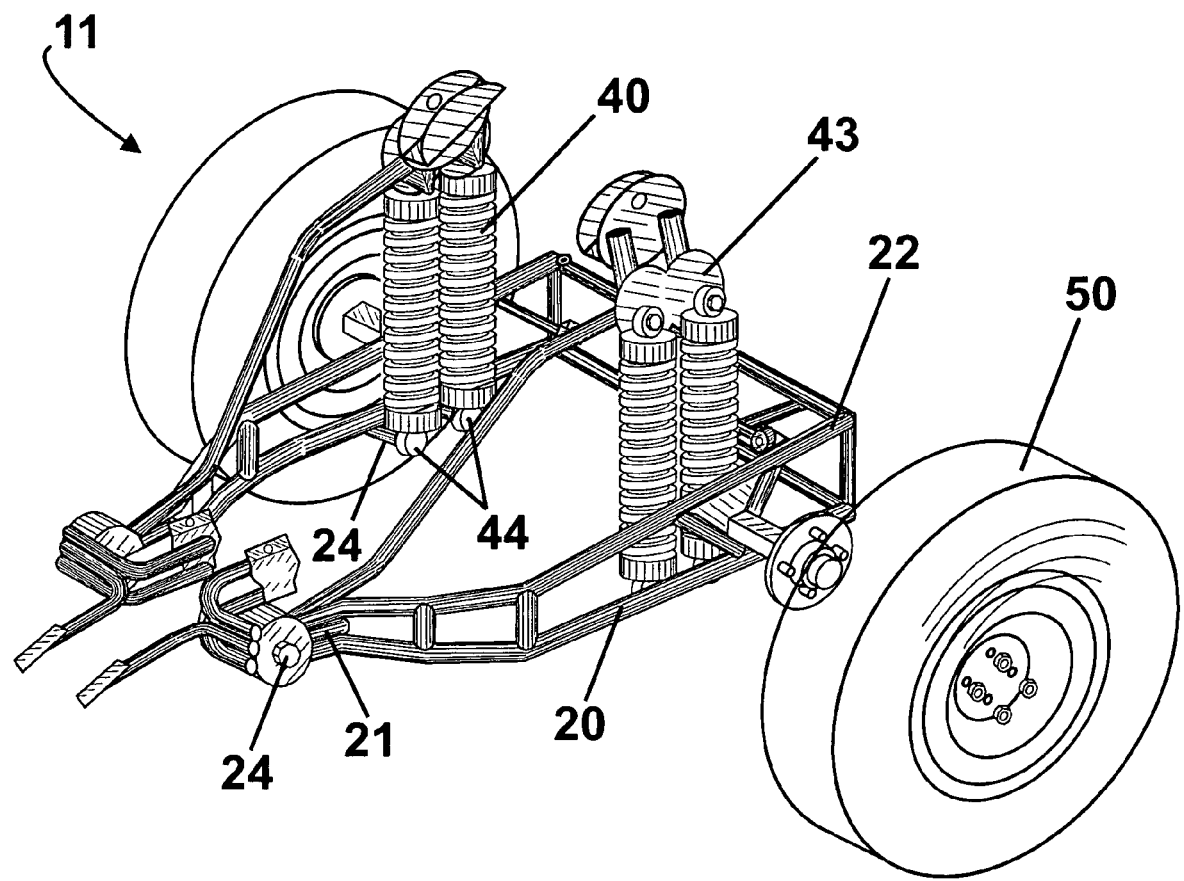
FIG. 1 illustrates perspective view of the conversion assembly, particularly trailing arm structural components.
Figure 2:
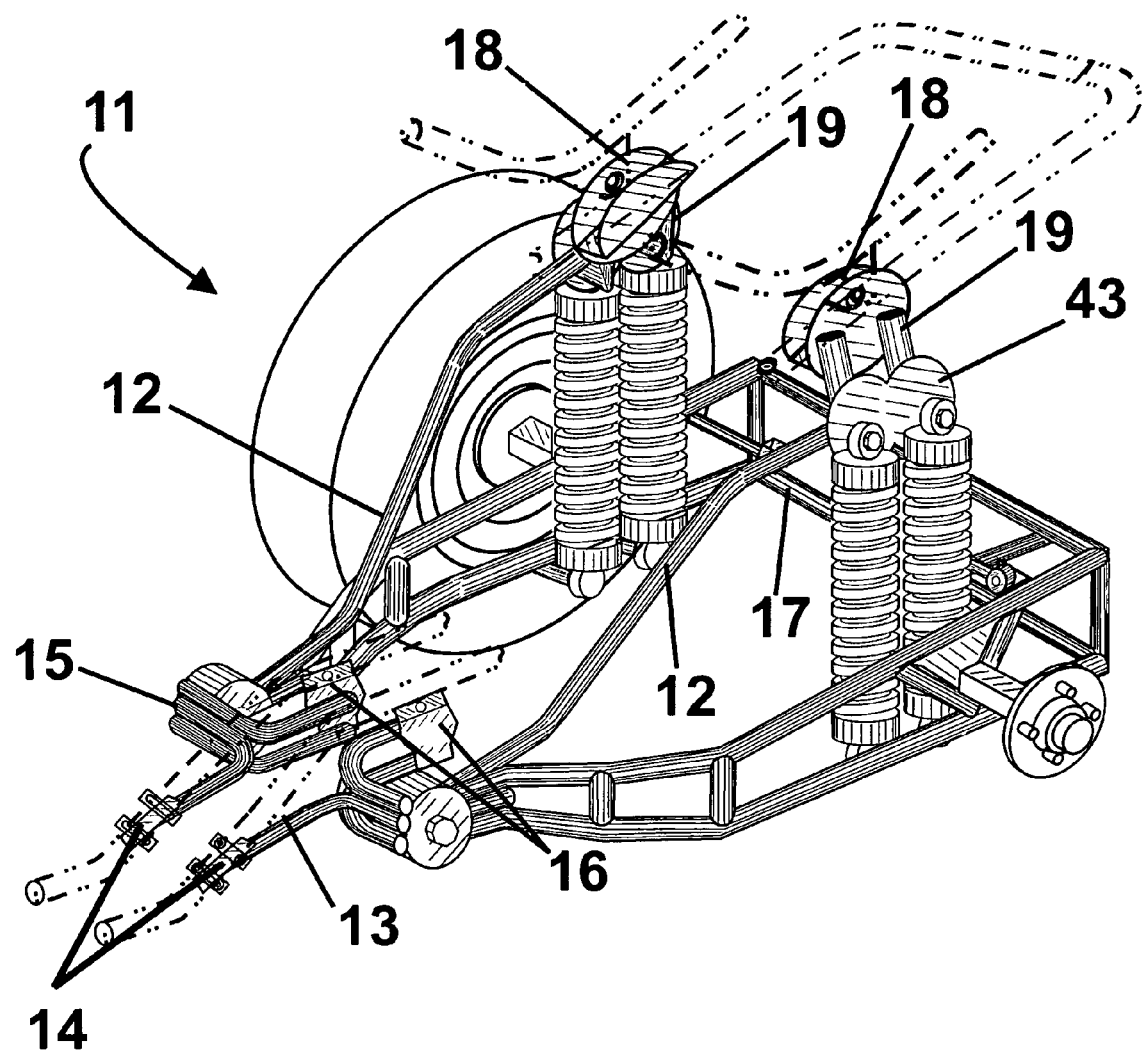
FIG. 2 illustrates perspective view of the conversion assembly demonstrating the connection points to the original motorcycle frame to be converted.

As shown in FIG. 1 and FIG. 2 the motorcycle conversion assembly 11 consists primarily of a pair of sub-frame structures 12, a pair of trailing arm structures 20, a pair of pivot bushings 24, a pair of stabilizer rods 30, and plurality of coil over shock absorber assemblies 40, upper shock absorber mounts 43, lower shock absorber mounts 44, a pair of wheel hub assemblies 50 and a rearward connection structure 51. When the present invention is in use, the motorcycle conversion assembly 11 may be covered by a fiberglass fender and cover assembly for aesthetic purposes.

The sub-frame structure 12 extends laterally along each side of the motorcycle. Each sub-frame structure 12 has a front section 13, a middle section 15 and a rear section 17, with each section having an independent connection means to the original cycle frame as shown in FIG. 2. The front section connection means 14 and middle section connection means 16 consists of a contoured plates used to rigidly affix the front section 13 and middle section 15 of the sub-frame structures 12 to the original cycle frame via a connection mechanism such as a U-bolt or similar mechanism. The rear section 17 of the sub frame 12 terminates at the upper shock absorber mounts 43 to which it is affixed using a bolt or similar connection means. The rear section connection means 18 consists of a concave channel connected to the rear section 17 of the sub frame 12 via a plurality of essentially L-shaped tubular alloy projections 19. Depending upon the cycle design being utilized with the present invention, the exact location of the three sub-frame structure 12 connection points may vary as well as the connection means used to secure the sub frame 12 to the frame of the original cycle such as U-bolts or similar connection means.

By maintaining three independent connection sites to the motorcycle frame, the present invention is securely attached to the original cycle frame which provides for a fluid ride when the present invention is in use. Additionally, multiple connection sites prevent excess strain on any one connection site on the cycle frame as well as the conversion assembly 11.

Connected to the sub-frame structures 12 are two trailing arm structures 20 which each have a first end 21 and second end 22 as shown in FIG. 1. The second ends 22 of each of the trailing arms structures 20 extend past the axis of the drive wheel of the original motorcycle wherein an axle 23 laterally extends from each trailing arm structure 20. In an advantageous embodiment of the present invention, the rotational axis of the wheel hub assemblies 50 are at least six inches aft of the rotational axis of the drive wheel of the cycle to be converted. By offsetting the wheel hub assemblies 50 from the drive wheel, a longer wheelbase and wider track is achieved to provide greater stability. By maintaining the braking mechanism with the drive wheel of the original cycle, which is between and slightly forward of the added wheel hub assemblies 50, the braking capabilities will remain evenly dispersed throughout the rear portion of the cycle and the conversion assembly 11. With the original drive tire remaining dominant, additional breaking mechanisms are not required, leaving the cycle fully functional should the conversion assembly 11 be removed.

Figure 3:
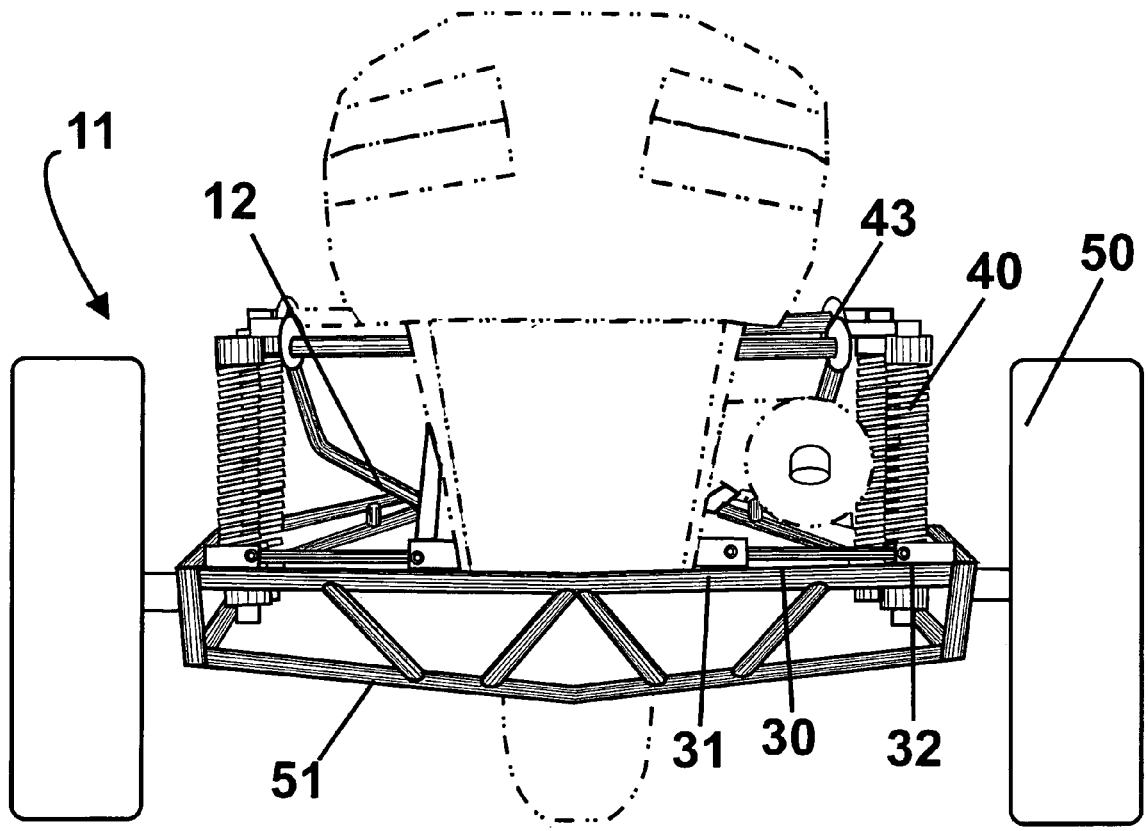
FIG. 3 illustrates rear perspective view of the conversion assembly.
Figure 4:
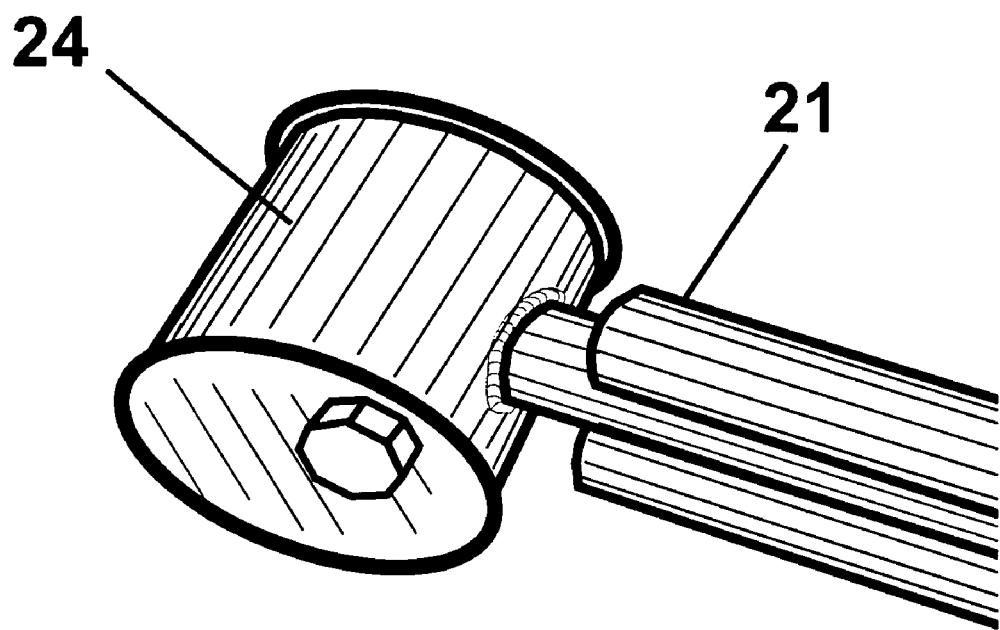
FIG. 4 illustrates a perspective view of the bushing assembly and trailing arm connection point.

The second ends 22 of each of the trailing arm structures 20 are joined by a rearward connection structure 51 which extends horizontally across the rear of the conversion assembly 11, forming a cavity in which the rear drive wheel of the motorcycle is placed therein, as shown in FIG. 3. The first ends 21 of the trailing arm structures 20 incline towards the side frames of the motorcycle and are each retained in a pivot bushing 24 as shown in FIG. 4. This connection allows the trailing arm structures 20 to pivot in response to road imperfections, thereby reducing rigidity of the conversion assembly 11 when the motorcycle encounters an uneven riding surface. The rearward connection structure 51 and the trailing arm structures 20 may both utilize truss technology which allows for greater load displacement throughout the aft end of the cycle and conversion assembly 11, thus increasing the life of the individual structures.

A stabilizing rod 30, having a proximal end 31 and a distal end 32, pivotally attach each of the trailing arm structures 20 to the original cycle frame. As can be shown in FIG. 3, the stabilizing rods 30 connect to the trailing arm structures 20 near the distal ends 32 while the proximal end 31 of the stabilizing rods 30 connects to the motorcycle frame at the motorcycle's original lower shock mount. The horizontal stabilizing rods 30 assist in providing a solid connection between the trailing arm structures 20 and the original motorcycle frame. The stabilizer rods 30 provide horizontal stability of the conversion assembly 11 and assist in maintaining the centered orientation of drive wheel within the conversion assembly 11. The pivotal connections of the proximal 31 and distal ends 32 of the stabilizing rods 30 prevent rigidity, thereby decreasing stress and strain on the framework of the original motorcycle and the conversion assembly 11.

As is shown in FIG. 1, a plurality of coil-over shock absorbers 40 are used on each side of the present invention. The plurality of progressive coil-over shock absorber assemblies 40 serves to provide a hydraulically damped spring suspension between the original motorcycle frame and the motorcycle conversion assembly 11. Additionally, the coil-over shock absorbers 40 can be modified for optimal performance of the conversion assembly to optimize ride height, suspension height and preload to reduce hardware fatigue and obtaining optimal fit for cycle and rider. Each of the coil-over shock absorbers 40 are affixed by an upper shock absorber mount 43 and a lower shock absorber mount 44. The upper shock absorber mounts 43 attach to the rear section 17 of the sub-frame structures 12 using bolt and nut assemblies or similar connection means. The lower shock absorber mounts 44 are attached to the trailing arm structures via horizontal tubular projections 24, shown in FIG. 1, which are permanently affixed to the trailing arm structures 20.

The shock absorbers 40 of the present invention may be mounted in a vertical position, perpendicular from the ground surface. However, in an alternative embodiment, the shock absorbers 40 may also be mounted at a slight angle from the ground, depending of the swing radius of the trailing arm structures 20 and the cycle application. The angle may include a forward angle for one or both of the shock absorbers 40. Additionally each of the two shock absorbers 40 may be placed and differing angles.

The coil springs that are a part of the shock absorbers 40 are a progressive type spring in which the spring return rate pressure increases with the spring compression to reduce lateral tilt or sway of the cycle. Additionally, the present invention may utilize a single shock absorber 40 in conjunction with each axle 23 and wheel hub assembly 50, if preferred by the user.

A cover to match the finish of the motorcycle may be used in conjunction with the present invention to provide an aesthetic finish to the modified cycle. Additionally, fiberglass fender assemblies may be added to protect the added wheel and tires assemblies as well as keep debris from being tossed upwardly which could interfere with the cyclist and other vehicles.

The invention claimed is:

1. A motorcycle conversion assembly for converting a two-wheeled cycle having a front and a rear wheel to a four-wheeled cycle comprising;

A pair of sub-frame structures, laterally extending, as an addition, from an original motorcycle frame on both the left and right sides of the motorcycle frame, said sub-frames having a front section, a middle section and a rear section;

said sub-frame structures rigidly secured to the motorcycle frame at two or more locations;

a pair of trailing arms structures consisting of a right and left structure extending aft of the motorcycle on both a right side and a left side of the rear wheel with both trailing arm structures having a first and second end and said second ends extending just beyond the rear wheel of the motorcycle and said first ends pivotally mounted to said middle sections of said sub-frame structures;

a connection structure joining said second ends of said trailing structures to form a cavity in which the rear wheel of the motorcycle resides;

a pair of wheel hub assemblies, each being independently and rotatably attached near said second end of said trailing arm structure, and extending outwardly from said trailing arms;

one or more shock absorber assemblies operatively connecting said trailing arm assemblies to said rear sections of said sub-frame structures;

a pair of stabilizer rods, pivotally securing each of said trailing arm structures to the original motorcycle frame.

2. The motorcycle conversion assembly of claim 1 wherein;
said front section of the said sub-frame comprises a first connection means;
said middle section of the said sub-frame comprises a second connection means;
said rear section of the said sub-frame comprises a third connection means.

3. The motorcycle conversion assembly of claim 1 wherein;
said wheels of said wheel hub assembly are essentially equal in size to the wheels on the original motorcycle.

4. The motorcycle conversion assembly of claim 2 wherein;
said first, second and third connection means do not require the addition of welded or permanently affixed components to the original motorcycle frame.

5. The motorcycle conversion assembly of claim 1 wherein;
said coil over shock absorber assemblies can be angled according to load conditions.

6. The motorcycle conversion assembly of claim 1 wherein;
the original drive wheel as originally designed is maintained as the motive force means and braking center of the converted motorcycle.

7. The motorcycle conversion assembly of claim 1, wherein;
the axis of the wheel hub assemblies are 6 or more inches aft of the axis of the cycle's existing drive wheel.

8. The motorcycle conversion assembly of claim 1, wherein;
at least four of said shock absorber assemblies are used to operatively connect said trailing arm assemblies to said rear sections of said sub-frame structures.

9. A method of converting a two wheeled cycle into a four wheeled cycle of claim 1:
attaching said sub-frame structures to the original cycle frame using a first, second and third connection means and essentially traversing the length of the original motorcycle frame.

10. The motorcycle conversion assembly of claim 1, wherein;
said sub-frame can be removed from the original cycle frame to restore the original two wheeled cycle.

* * * * *